United States Patent [19]
Huber et al.

[11] Patent Number: 5,870,433
[45] Date of Patent: Feb. 9, 1999

[54] METHOD OF PROCESSING SIGNALS IN A VITERBI DECODER ACCORDING TO DELAYED DECISION FEEDBACK SEQUENCE ESTIMATION (DDFSE) ALGORITHM

[75] Inventors: Johannes Huber, Langensendelbach; Jens Benndorf, Neustadt; Hans Volkers, Hanover; Ralf Hempel, Neustadt, all of Germany

[73] Assignee: ke Kommunikations-Eletronik GmbH & Co., Hanover, Germany

[21] Appl. No.: 760,649

[22] Filed: Dec. 4, 1996

[51] Int. Cl.[6] .................................................. H04L 27/22
[52] U.S. Cl. ..................... 375/233; 375/262; 375/341; 375/350; 364/724.012; 364/724.19; 364/724.2; 371/43.7; 371/43.8
[58] Field of Search ..................................... 375/229, 233, 375/262, 265, 340, 341, 346, 348, 350; 371/43.6, 43.8, 43.4; 364/724.011, 724.012, 724.13, 724.16, 724.19, 724.2

[56] References Cited

U.S. PATENT DOCUMENTS

| | | | |
|---|---|---|---|
| 5,644,603 | 7/1997 | Ushirokawa | 375/341 |
| 5,673,288 | 9/1997 | Okanoue | 375/231 |

OTHER PUBLICATIONS

"Error–Correction Coding for Digital Communications" George C. Clark, Jr. and J. Bibb Cain *Applications of Communications Theory*, pp. 252–267.

"Maximum–Likelihood Sequence Estimation of Digital Sequences in the Presence of Intersymbol Interference", G.D. Forney, Jr., *IEEE Transactions on Information Theory*, vol. IT–18, No. 3, May 1972, pp. 363 to 378.

"The Viterbi Algorithm", G.D. Forney, Jr., *Proceedings of the IEEE*, vol. 61, Mar. 1973, pp. 268 to 277.

Delayed Decision–Feedback Sequence Estimation, A. Duel–Hallen, et al., *IEEE Transactions on Communications*, vol. 37, No. 5, May 1989, pp. 428 to 436.

*Primary Examiner*—Amanda Le
*Attorney, Agent, or Firm*—Ware, Fressola, Van Der Sluys & Adolphson LLP

[57] ABSTRACT

A method of digital telecommunication via an electrical cable is provided, whereby the symbols of a data stream to be transmitted are supplied as a transmission signal to a transmission path, after undergoing a digital-to-analog conversion. The transmission signal is received and sampled at the end of the transmission path on a receiving side. To further process the received signal on the receiving side, a Viterbi decoder operating on the basis of a trellis diagram is used. The Viterbi decoder uses a number of feedback filters to determine branch or path metrics in the trellis diagram, where this number is a function of the number of states in the trellis diagram. To determine the branch metrics in the trellis diagram, separate first feedback filters (8) are only used up to a specifiable number of symbol intervals in the trellis diagram, or up to a specifiable length of feedback filters for all states in the trellis diagram. A common feedback filter (9) is used for the other symbol intervals in the trellis diagram, to which the symbols of the path with the smallest path metrics at the end of the first feedback filter (8) in the trellis diagram are supplied.

15 Claims, 5 Drawing Sheets

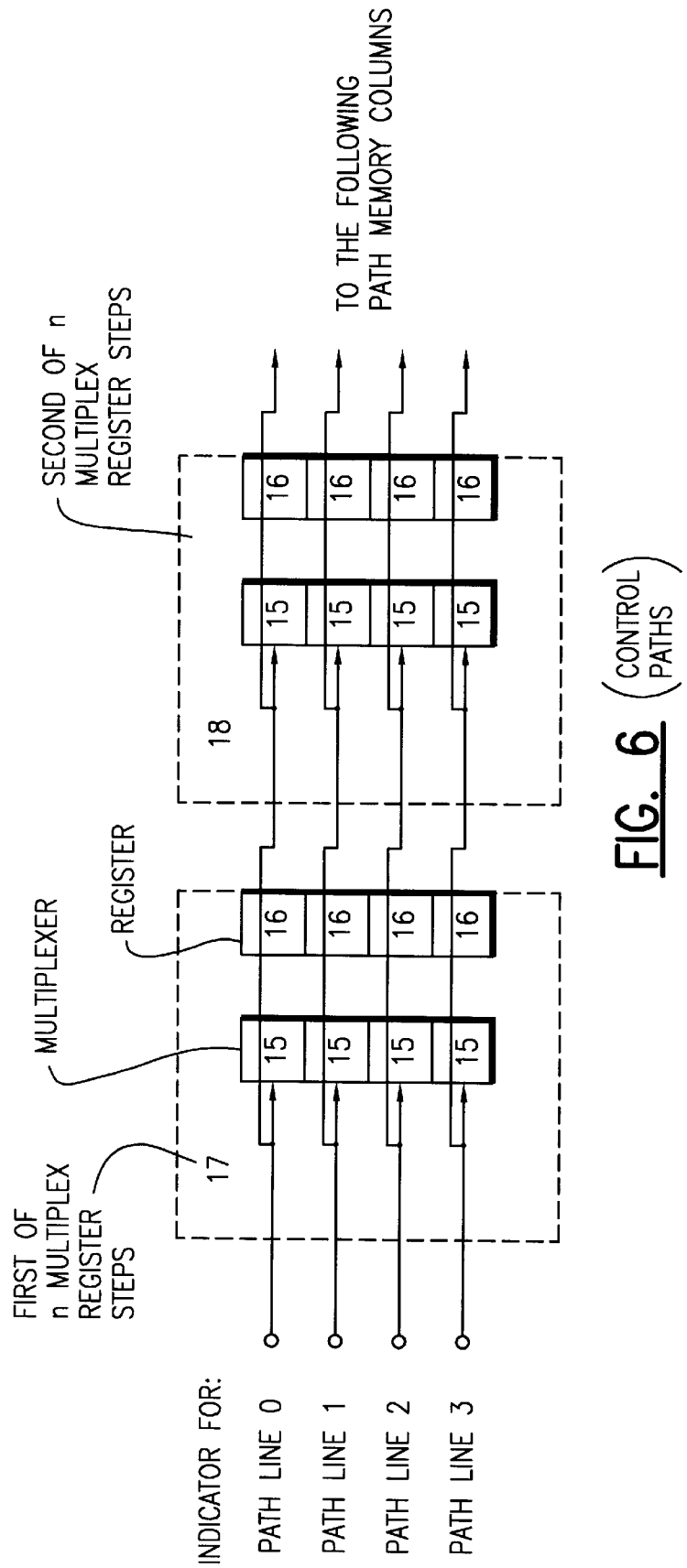
FIG. 6 (CONTROL PATHS)

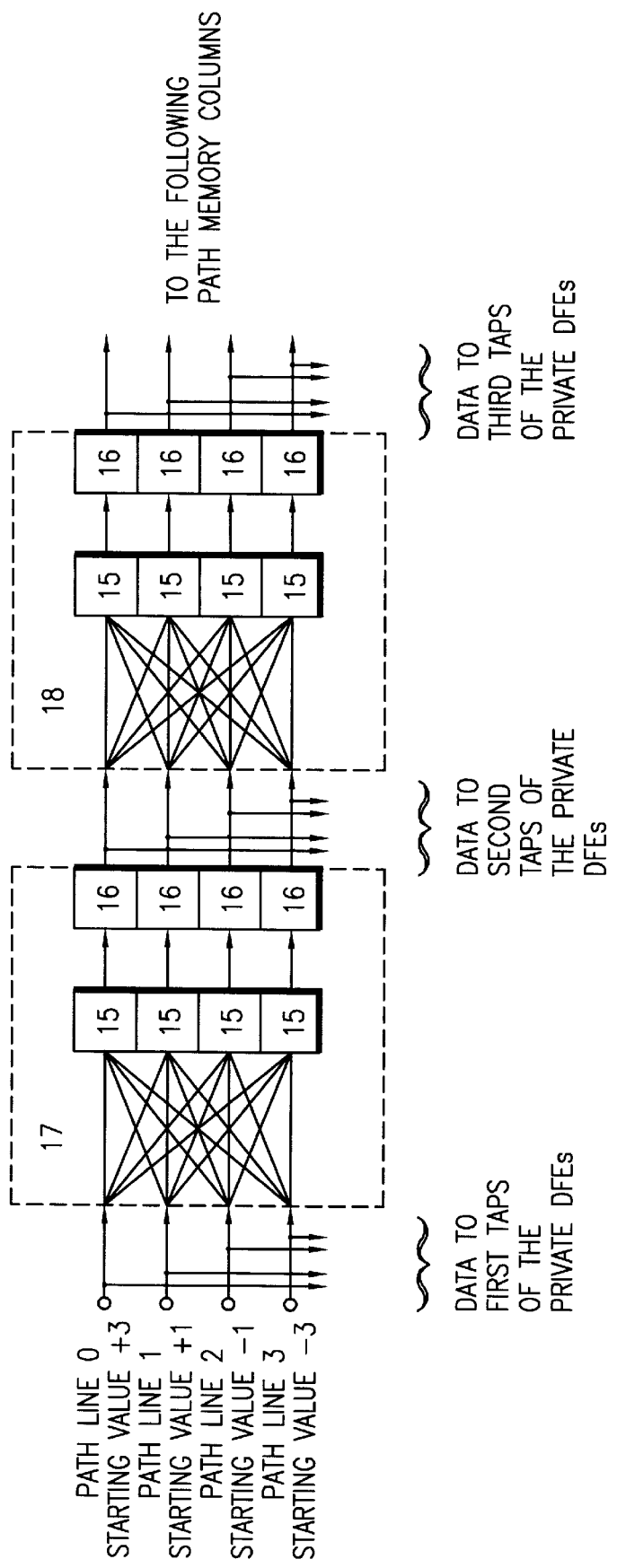

METHOD OF PROCESSING SIGNALS IN A VITERBI DECODER ACCORDING TO DELAYED DECISION FEEDBACK SEQUENCE ESTIMATION (DDFSE) ALGORITHM

BACKGROUND OF THE INVENTION

1. Technical Field

The invention concerns a method of digital telecommunication via an electrical cable, and more particularly, a method of digital telecommunications where the symbols of a data stream to be transmitted are supplied as a transmission signal to a transmission path after undergoing a digital-to-analog conversion, where the transmitted signal is sampled at the end of the transmission path and is then further processed and supplied to a decision element, and where a Viterbi decoder operating on the basis of a trellis diagram is used to further process the sampled signal, which uses a number of feedback filters to determine branch and path metrics in the trellis diagram, where this number is a function of the number of states in the trellis diagram, with in-line filter taps according to the Delayed Decision Feedback Sequence Estimation-Algorithm.

2. Description of the Prior Art

Digital telecommunication via band-limited channels, such as e.g. copper cables in a local subscriber line network, are subject to disturbances in the form of intersymbol interferences, noise and pulse noise, which produce a limitation of the maximum transmission range. The widest possible equalization (correction) of the intersymbol interference can be achieved with the help of adaptive equalization methods based on digital filter algorithms. However, the performance capacity of such mostly linear filter algorithms is restricted by limited word lengths of digital signal processing and a limited total complexity, as well as by noise and nonlinearities in the analog circuit portion of the transmitting and receiving devices.

An increase in the transmission range or in the resistance to interference is possible with the help of optimum receiving methods according to the principle of Maximum Likelihood Sequence Estimation (MLSE) as disclosed in the document "Maximum-Likelihood Sequence Estimation of Digital Sequences in the Presence of Intersymbol Interference", G. D. Forney, Jr., *IEEE Transactions on Information Theory*, volume IT-18, no. 3, May 1972, pages 363 to 378, which provides an example of an MLSE receiver. In this example the transmission channel is considered a "finite state machine". Using a Viterbi algorithm, as disclosed for example in the document "The Viterbi Algorithm", G. D. Forney, Jr., *Proceedings of the IEEE*, volume 61, March 1973, pages 268 to 277, an estimate of the transmitted signal sequence is obtained by using the channel states according to the Maximum Likelihood criterion.

A problem in principle during the implementation of MLSE algorithms is the proportionality of complexity (number of gates being used) and the number of states in the trellis diagram, which in turn increases exponentially with the channel memory, i.e. with the length of the pulse response in the dispersive transmission channel. The Delayed Decision Feedback Sequence Estimation (DDFSE) algorithm, also known from the document "Delayed Decision-Feedback Sequence Estimation", A. Duel-Hallen, et al., *IEEE Transactions on Communications*, volume 37, no. 5, May 1989, pages 428 to 436, is a method of decreasing the number of states in the trellis diagram. As with the Viterbi algorithm, in this case as well the states describe all the state variations of the channel considered a "finite state machine" within an established time interval of $\mu$ symbols. However, while $\mu$ is identical to the length of the channel memory in the MLSE algorithm, $\mu$ can be freely chosen in the DDFSE algorithm. This means that a finite $\mu$ can even be used with an infinitely long channel memory.

Each state of the trellis diagram in the DDFSE algorithm only represents a part of the information about the channel state. The rest of the information is estimated by means of the transmission symbols of the highest probability, which correspond to the preceding path decisions and are stored in a path memory. The DDFSE algorithm combines the properties of the Viterbi algorithm with those of a decision feedback equalization. The DDFSE algorithm can also be imagined with $X^\mu$ feedback filters, where the filter taps of the feedback filters being used are fed different receiving symbols during each symbol interval. In this case X is the number of possible symbols or amplitude stages per step. The combination of symbols in one of the feedback filters, which leads to the smallest error in the decision element, is optimum in the sense of maximum likelihood.

The complexity of the DDFSE algorithm rises exponentially with the parameter $\mu$, i.e. with the number of symbols considered in its states, or proportionally with the number of states in the trellis diagram. The gain in the DDFSE algorithm increases with increasing $\mu$ as well as with the increasing length n-$\mu$ of the feedback filters during the determination of the branch metrics. In that case n indicates the number of filter tap operations for determining the branch metrics per state of the trellis diagram, which in the following is set to be equal to the number of postcursors in the time-discrete channel pulse response. Each filter tap operation comprises an addition, a multiplication and a register operation. The implementation of sufficiently long feedback filters for all states of the trellis diagram requires a large number of logic gates as well as a considerable amount of circuitry.

SUMMARY OF THE INVENTION

An object of the invention is to provide a simplified method of processing a received signal in a Viterbi decoder operating on the basis of a trellis diagram according to a Delayed Decision Feedback Sequence Estimation (DDFSE) algorithm.

According to the present invention, in a method of digital communications via an electrical cable where the symbols of a data stream are supplied as a transmission signal after undergoing a digital-to-analog conversion, a received signal at the end of the transmission path is sampled and processed in a Viterbi decoder operating on the basis of a trellis diagram according to a DDFSE algorithm, wherein to determine the branch metrics of the trellis diagram, separate first feedback filters are used up to a specifiable length of symbol intervals in the trellis diagram, or up to a specifiable length of feedback filters for all states of the trellis diagram, and wherein a common feedback filter is used for other symbol intervals in the trellis diagram, to which the symbol at the end of that separate first feedback filter is supplied which corresponds to the path having the smallest path metrics in the trellis diagram.

With this method each of the feedback filters being used is split into two parts. The first part contains the portion of the branch metrics that can be different for each path in the trellis diagram. The second part is only determined once for all paths along the path with the smallest path metrics at the end of the first part of the feedback filters. The splitting of the feedback filters into two parts relies upon the fact from the theory of the Viterbi algorithm that all paths in the trellis diagram merge after a small number of symbol intervals with high probability. In the DDFSE algorithm this corresponds to an adaptation of the last part of the branch metrics totals, since the last symbols of all paths are very probably the same and are located in a "surviving" path.

The effect of these latter symbols or coefficients of the feedback filters in the surviving path on the branch metrics can be small. However, a total disregard of these latter coefficients can lead to a clear degradation of the algorithm through pulse interferences that were not taken into account. Therefore, these latter coefficients are not disregarded with this method, but are taken into account by the common feedback filter. Since the first feedback filters are only used for a limited number of symbol intervals for all states of the trellis diagram, while the common feedback filter is used for the subsequent symbol intervals, the number of filter tap operations or gates can be considerably reduced. This reduction provides a considerable simplification of the amount of circuitry without significantly affecting the decisions.

The method has the further advantage that a known Register-Exchange method, as disclosed by G. C. Clark, J. and B. Cain "Error Correction Coding for Digital Communications", New York, Plenum 1981, the disclosure of which is incorporated herein by reference, can be used for storing the state sequences of the trellis diagram in a path memory belonging to the Viterbi decoder. This method allows the path memory cells to be directly connected to the multipliers in the feedback filters. Thus, tracing back the path in the trellis diagram becomes especially easy.

The invention will be fully understood when reference is made to the following detailed description taken in conjunction with the accompanying drawings.

BRIEF DESCRIPTION OF THE DRAWINGS

FIG. 3 is a trellis diagram which the Viterbi decoder of FIG. 2 operates in accordance with;

FIG. 6 is a schematic block diagram of a path memory implemented using the present invention, which can be used in the Viterbi decoder of FIG. 2, showing the control paths for the Register-Exchange method; and FIG. 7 is a schematic block diagram of a path memory implemented using the present invention, which can be used in the Viterbi decoder of FIG. 2, showing the data paths for the Register-Exchange method.

DETAILED DESCRIPTION OF THE INVENTION

As already explained above, in a Viterbi decoder operating on the basis of a trellis diagram according to a DDFSE algorithm, the number of filter taps or gates used with feedback filters of the Viterbi decoder increases with the number of states of the sample values, which in turn depend on the number $\mu$ of symbols represented by the states in a trellis diagram. In the case of $\mu=0$, the Delayed Decision Feedback Sequence Estimation (DDFSE) receiver is reduced to a Feedback Filter (DFE) receiver in accordance with the block diagram in FIG. 1. The description of this block diagram takes place with the aid of a D-transformation where D stands for delay. In this case the delay is by one symbol clock pulse.

Figure 1:
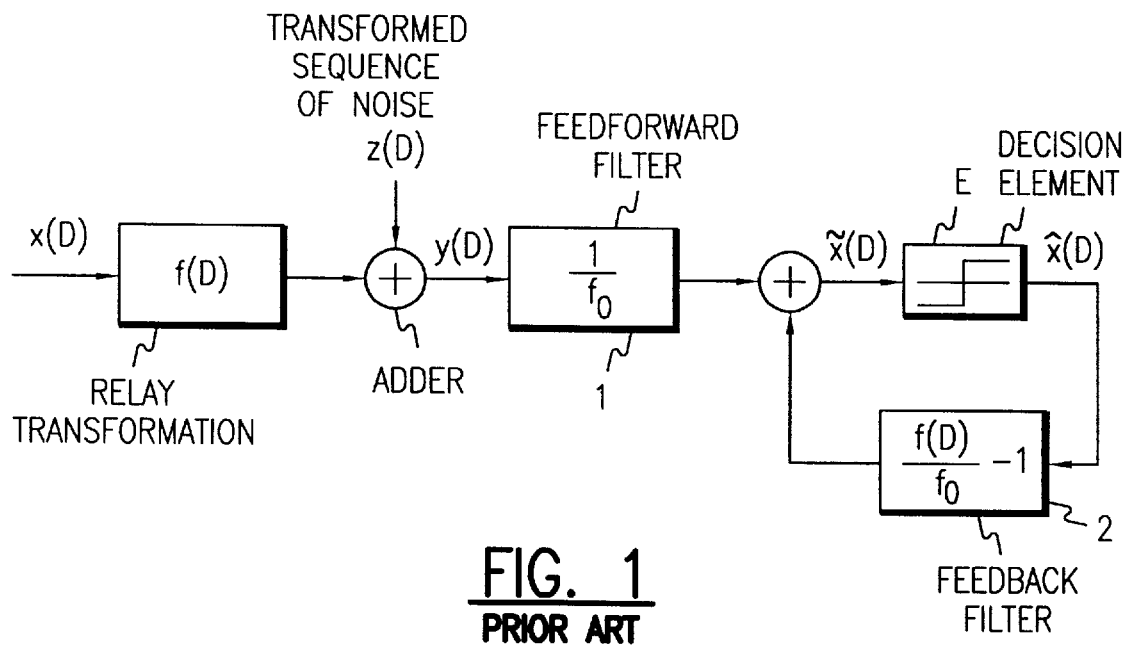
FIG. 1 is a schematic block diagram of a receiver having only one feedback filter.

In the DFE receiver of FIG. 1, a sending sequence (transmission signal) $(x_0, x_1 \ldots)$, whose D-transform sequence is:

$$x(D) = x_0 + x_1 D + x_2 D^2 + \ldots$$

is folded in the channel with the sample values of the channel pulse response by the D-transform f(D), which for reasons of simplification in this instance is assumed to comprise only the principle value $f_0$ and the postcursors $f_1$ to $f_n$, and are burdened with DC free Gaussian noise. With a favorable choice of the analog receiver input filter and possible subsequent digital filtering, the noise in this time-discrete equivalent network diagram is additionally nearly white noise. The following applies to the D-transformed sequence of sample values:

$$y(D) = f(D) \times x(D) + z(D)$$

where z(D) is the D-transformed sequence of noise sample values.

The resulting sequence $(y_0, y_1 \ldots)$ of sampling of the bandlimited receiver input signal is processed further and supplied to a decision element E. A feed-forward filter 1 and a feedback filter 2 are used for the further processing.

Figure 2:
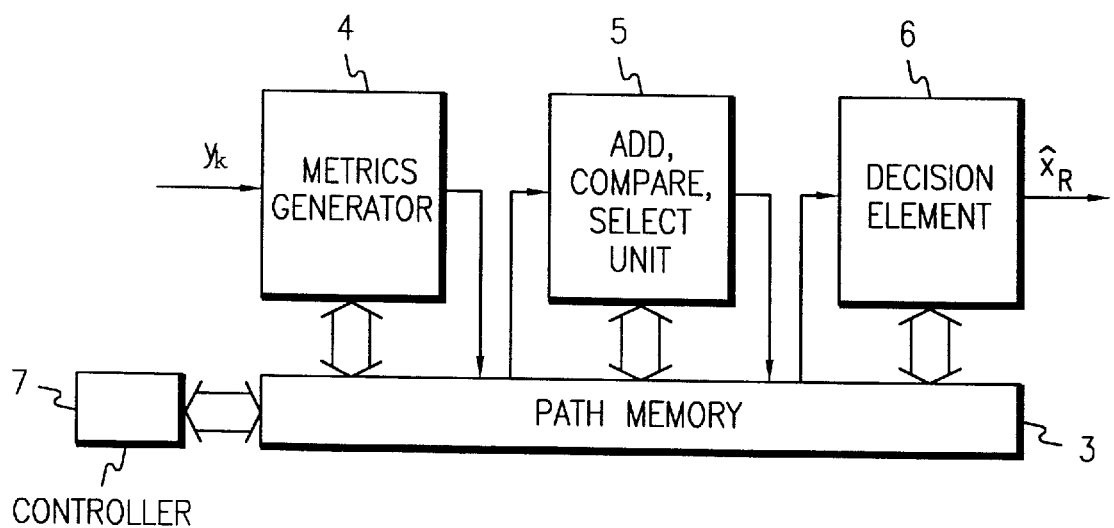
FIG. 2 is a schematic block diagram of a Viterbi decoder used with the receiver of FIG. 1.

In the DDFSE algorithm used here, the DFE equalization with only one feedback filter 2, explained by means of FIG. 1, is completed by the Viterbi algorithm with a number of feedback filters built up of a large number of filter taps, which represent the states $X^\mu$ in the trellis diagram. FIG. 2 depicts the schematic construction of a decoder operating in accordance with the Viterbi algorithm, which operates on the basis of the trellis diagram in FIG. 3. The Viterbi decoder, which can be seen in the circuit diagram in FIG. 2, has a path memory 3 to which a metrics generator 4, an Add, Compare and Select (ACS) unit 5, a decision element 6 and a controller 7 are connected. The current sample value $y_k$ is supplied to the metrics generator 4. The decided value $\hat{x}_k$ is available at the output of decision element 6. The controller 7 controls the interaction of all of the other components 3–6 of the Viterbi decoder.

The task of the path memory 3 consists in storing the state sequences of the $X^\mu$ surviving paths in the trellis diagram. The selection of the surviving path with the smallest path metrics can take place in accordance with a trace-back algorithm and the Register-Exchange method (FIGS. 6 and 7) as disclosed by G. C. Clark and J. B. Cain, "Error Correction Coding for Digital Communications", New York, Plenum, 1981, the disclosure of which is incorporated herein by reference. An example of the path memory is illustrated by $\mu=1$ in FIGS. 6 and 7.

FIGS. 6 and 7 illustrate multiplexers 15, which have four data inputs for each two bits and a control input. In addition there are registers 16 with one input and one output for each two bits. A first of the n multiplexer register steps is designated 17, a second is 18. FIG. 6 illustrates the connection of the control inputs of multiplexers 15. FIG. 7 illustrates the connection of the data inputs of multiplexers 15.

Referring to FIGS. 2, 6 and 7, the trace-back algorithm traces back a path in every symbol clock pulse, namely the path with the best path metrics, across the depth of the path memory 3, and outputs the data marking the end of the tracing action. State indicators are stored and evaluated during the tracing action.

With the less expensive Register-Exchange method according to FIGS. 6 and 7 used to advantage in this case, no indicators are stored. Instead, direct state data are stored. The state data memory of the register exchange method comprises a matrix with $X^\mu$ lines and n steps of ld(X) bit wide memories each, which contain the state data. The first two of the n steps are termed 17 and 18 in FIGS. 6 and 7. The multiplexers 15 are located between each step. Constant state data are present at the input of the first multiplexer 15 in step 17 (FIG. 7). These state data of the $X^\mu$ lines correspond to the value whereby the coefficient $f_1$ is multiplied in order to be calculated for the branch metrics of the state $\upsilon$ being considered with $\upsilon \in [1, 2, \ldots, X^{82}]$.

All multiplexers of the $\upsilon$th line are adjusted like the indicator of the current ACS operation of the $\upsilon$th state. Then, by means of a one-time pulsing of the registers 16, the contents are redirected to the path adjusted by the multiplexers 15. In this case the state data in the first steps 17 and 18 are different. However, with each redirecting to the following steps there is the possibility of overwriting the state data. The step in which all state data are identical is called the step in which the above mentioned "path merging" has taken place. After, the step in which path merging occurs, the state data of all lines remain identical.

The $X^\mu$ indicators of the ACS operation are used immediately in each symbol step in order to redirect the state data.

The knowledge that the state data of the $X^\mu$ paths in the trellis diagram are located in the $X^\mu$ path lines of path memory 3 allows the outputs of register 16 (FIG. 7), which contain the symbols along the trellis paths, to be directly connected to the multipliers of the $X^\mu$ private feedback filters. The path memory 3 according to the register exchange method implies a resorting of the data-dependent paths in the trellis diagram, so that the $X^\mu$th path is always mapped into the $X^\mu$th path memory line. The symbols in the path memory lines thereby are directly the input data for the feedback filters.

Figure 3:
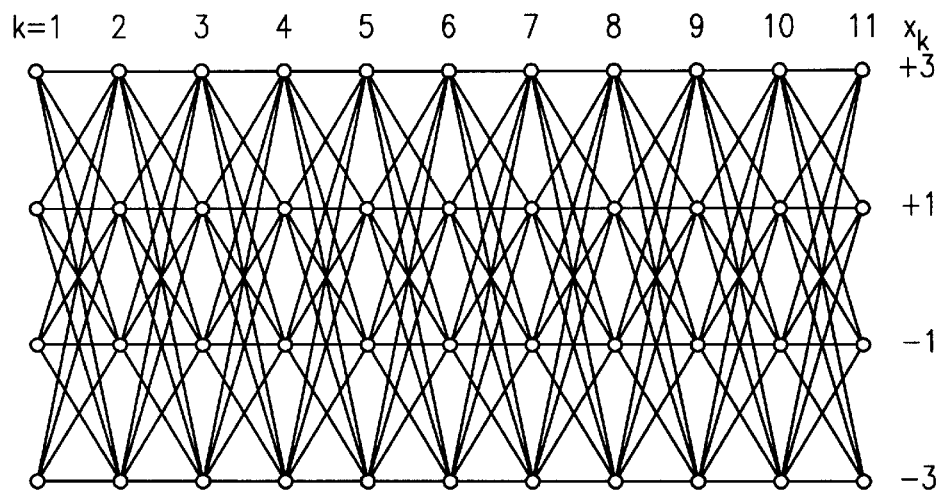

FIG. 3 illustrates a trellis diagram for a quaternary transmission signal with the four amplitude stages +3, +1, −1 and −3 for $\mu=1$, i.e. for $4^1=4$ states. Differently constructed trellis diagrams result from a different type of transmission signal, for example a binary and a different $\mu$. A transmission signal with four amplitude stages and where $\mu=2$ would for example result into 16 states with 16 feedback filters. At the points $k_1$ to $k_{11}$ of the trellis diagram in FIG. 3, the respective states are located in the sampling instants. The respective sampling interval T is located between each two of these instants. In the example under consideration, four branches emerge from each of the four states +3, +1, −1 and −3 at each sampling instant, which lead to each state of the following or preceding sampling instant. A metric is assigned to each of these branches for weighing. The respective branch metric corresponds to the size of the error or the signal-to-noise ratio at the decision element 6 for the case where the symbol sequence of the path assigned to the state $\upsilon$ under consideration had been received from the path memory 3 (FIG. 2).

The following equation is used to determine the branch metrics ZM for the individual states $\upsilon$ in the trellis diagram at the instant k for all possible X current symbols z:

$$ZM_k^\upsilon(z) = (y_k - f_0 z - f_1 x_{k-1}^\upsilon - \ldots - f_\mu x_{k-\mu}^\upsilon + \omega_{k-\mu-1}^\upsilon)^2$$

-continued $$\omega_{k-\mu-1}^\upsilon = f_{\mu+1} x_{k-\mu-1}^\upsilon - \ldots - f_{\mu+\beta} x_{k-\mu-\beta}^\upsilon + f_{\mu+\beta+1} x_{k-\mu-\beta-1}^\upsilon - \ldots - f_n x_{k-n}^\upsilon$$

$$\underbrace{\hspace{3cm}}_{\text{private DFE}} \underbrace{\hspace{3cm}}_{\text{common DFE}}$$

Where:
$ZM_k^\upsilon(z)$=branch metric for state $\upsilon$ in the kth step
$y_k$=sample value of the received symbol
$f_0$=principal value of the channel pulse response
$f_1$ to $f_n$=postcursors of the channel pulse response
n=number of postcursors of the discrete-time channel pulse response
$x_k^\upsilon$=symbol assumed to have been transmitted at state $\upsilon$ in step k
z=symbol (amplitude stage) assumed to have been transmitted in the current step
$\omega_k^\upsilon$=intersymbol interference estimated for state $\upsilon$ caused by postcursors at step $k+\mu+1$
X=number of possible amplitude stages per step
$\mu$=number of symbols or postcursors considered in the states of the DDFSE algorithm
$\beta$=number of symbols considered in the private DFE
k=time index
DFE=feedback filter.

The part designated "private DFE" considers the portion of the feedback filters for which a feedback filter is used for each state of the trellis diagram. These are the separated first feedback filters together. The part designated "common DFE" includes the common feedback filter for all states.

At time k, each state $\upsilon$ in the trellis diagram is determined by a combination $(x_{k-1}^\upsilon, \ldots, x_{k-\mu}^\upsilon)$. The following branch metric results when $\mu=1$:

$$ZM^\upsilon k(z) = (y_k - f_0 z - f_1 x_{k-1}^\upsilon - \omega_{k-2}^\upsilon)^2,$$

where $\omega_{k-2}$ represents the estimate of $$\omega_{k-2}^\upsilon = \Sigma_{i=2}^n f_i x_{k-i}^\upsilon$$

from the path memory 3 in FIG. 2 to the corresponding state in the trellis diagram.

This value decays into two parts, namely one part $$p_{k-2}^\upsilon = \Sigma_{i=2}^{\beta+1} f_i x_{k-i}^\upsilon,$$

which is gained from the path of this state in a private DFE assigned to this state, and a part $$c_{k-2} = \Sigma_{i=2}^n f_i \hat{x}_{k-1},$$

which is gained from a DFE that is common to all states. In that case $\hat{x}_k$ designates the symbol already estimated as having definitely been transmitted for the step k. In every step this common DFE is supplied the symbol at the output of the $\beta-1$ path memory column of the particular state or of the path memory column which currently has the best, i.e. the smallest metrics. The supplied symbol is inserted into a sliding register for data (symbols) of the common DFE 9. The branch metrics $ZM_k^\upsilon(z)$ are determined or calculated in accordance with the above equation for each state $\upsilon$ and every possible current symbol z. For the next discrete time constant, thus during the transition from step k to step k+1, for all states $\lambda$ with $\lambda \in [1,2,\ldots,X^\mu]$ of the respective paths leading to a subsequent state $\lambda$, the one is chosen for which the accumulated path metric $PM_{k+1}(\lambda)$ is the smallest:

$$PM_{k+1}^\lambda = \min [ZM_k(z) + PM_k^\upsilon].$$

These accumulated path metrics $PM_{k+1}$ are stored and used as path metric $PM_k$ in the subsequent state. In addition to the minimum $X^\mu$ path metrics, the pertinent $X^\mu$ indicators, i.e. the indexes of the $ZM_k(z)$ are used as ACS indicators for the $X^\mu$ control inputs of the path memory (see FIG. 6). Subsequently the path memory is pulsed once, whereby the content of the i-th path memory column is passed on to the i+1-th path memory column via the multiplexer 15.

Firstly after a clock pulse of the path memory, the content of the last path memory column, whose line number is determined by the index $\lambda$ of the smallest of all accumulated minimum path metrics $PM_{min}$, is output as the definitely decided symbol. Secondly, the content of the $\beta-1$ path memory column, whose line number is determined by the index i from $PM_{min}$ of the minimum of all υ accumulated minimum path metrics, is output to the sliding register as the symbol for the data (symbols) of the common DFE 9.

While the symbols of the $X^\lambda$ paths are located in the $X^\lambda$ path memory lines during the physical realization of the path memory, it is easier to recognize the representation of the paths if these are illustrated as the example in FIG. 3. The paths belonging to the accumulated minimum path metrics $PM^\lambda_{k+1}$ are always drawn bold in FIG. 3. On the right side, the diagram starts at k=11 with the possible $X^\mu$ paths for the minimum $X^\mu$ path metrics. As drawn in FIG. 3, an $X_k$ belongs to each path beginning. With great probability only the surviving path remains on the left side. As can be seen in the example in FIG. 3, all paths run together at k=6.

The common path starting at k=6 is the definitely decided path, which has the smallest $PM_{min}$ of all minimum $X^\mu$ path metrics $PM_{k+1}$. At its end on the left side at k=1 the symbol $\hat{x}_1=3$ is issued as the definitely decided one, with which this path started at k=11.

Figure 4:
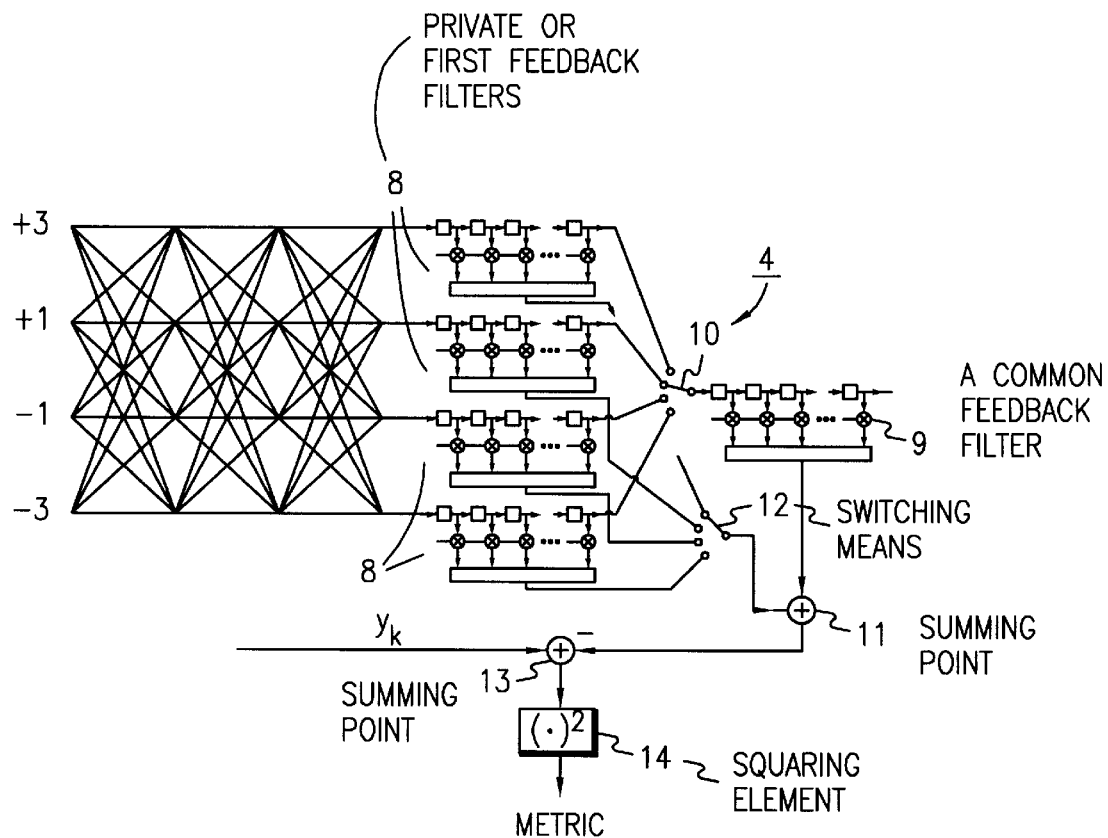
FIG. 4 is a schematic diagram of a metrics generator constructed in accordance with the trellis diagram of FIG. 3 utilizing the method of the invention.

The schematically illustrated metric generator 4 in FIG. 4 is constructed in accordance with FIG. 3 for a quaternary transmission signal. For $\mu=1$, each of the amplitude stages +3, +1, −1 and −3 is assigned a private or a first feedback filter 8 with a specifiable number $\beta$ of filter taps. Each filter tap comprises a memory cell, a multiplier and an adder. The linkage of the memory cells is shown in FIG. 7. The filter taps are switched in series in a kind of sliding register and form a so-called "FIR-filter". They are built up of a large number of gates.

The private or first feedback filters 8 are used to determine the branch metrics for the portion that is different in each path of the path memory 3. This applies to the trellis diagram illustrated in FIG. 3, thus back to the instant k=6. For the further portion of the branch metrics, only a common feedback filter 9 is used for all amplitude stages of the transmission signal, or for all states. It is always used for the path with the smallest accumulated path metric $PM^υ_{k+1}$, which must be indicated by the selector switch 10. The length of the private or first feedback filters 8 or the number $\beta$ of filter taps is always chosen so that the bit error rate just reaches a minimum in a simulation according to FIG. 5. Meaningful lengths of the private or first feedback filters 8 emerge for $\beta=5$ and $\beta=6$ in the described example (FIG. 5)

The respective sums of feedback filters 8 and 9 are added in the summing point 11 in accordance with the respectively considered path with the smallest path metric. Switching means 12, such as a selector switch, provides the respectively applicable private or first feedback filter 8 to the summing point 11. The output of the summing point 11, which is the sum of the thus determined and estimated intersymbol interferences through the channel postcursor, is subtracted from the sample value $y_k$ at the summing point 13, thereby eliminating the assumed interference, which corresponds to the state under consideration and was produced by previous transmission symbols. The branch metric $ZM^υ_k(z)$ is finally formed by applying the output of the summing point 13 to a squaring element 14.

Figure 5:
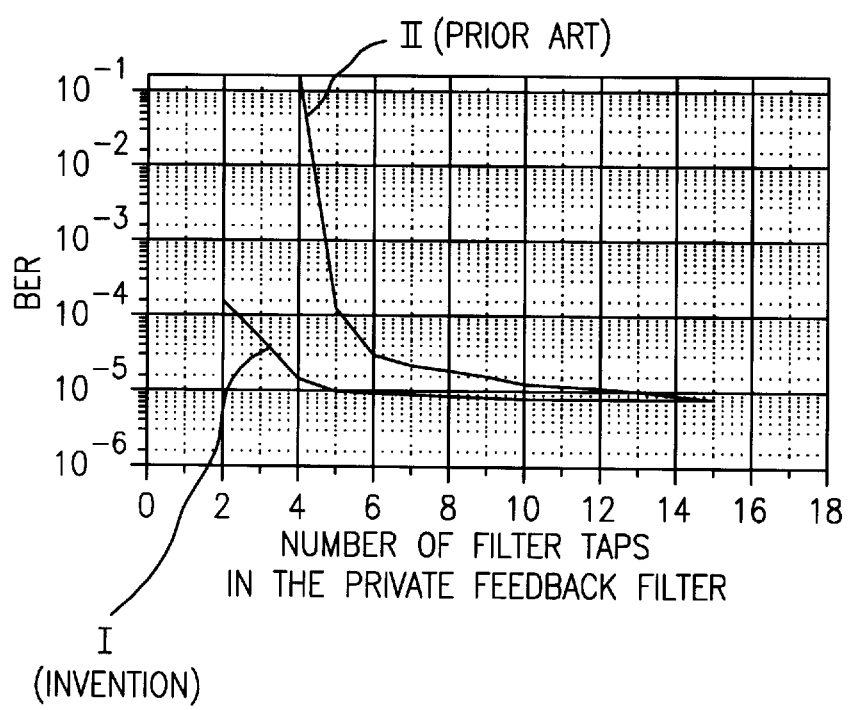
FIG. 5 is a diagram illustrating a comparison of the dependence of the bit error rate on the number of filter tap operations in the feedback filter of the Viterbi decoder of FIG. 2 using the prior art (curve II) versus the present invention (curve I)

For $\mu=1$ and X=4, thus for four states in the trellis diagram, the curves I (invention) and II (prior art) in FIG. 5 indicate the dependence of the bit error rate BER on the number $\beta$ of non-zero samples after the principal value (postcursors) in the discrete channel impulse response for the cable being used, which are considered by the respective private or first feedback filters 8. The postcursors n-$\beta$-$\mu$ not considered by the private or first feedback filters 8 (FIG. 4) are determined by the common feedback filter 9. As can be seen in curve I, the method of the invention already achieves nearly the minimum of the bit error rate at $\beta=5$. When the known DDFSE algorithm is used without an additional common DFE, the bit error rate only approaches this range according to curve II when $\beta>12$, since a strong degradation takes place when $\beta<12$ due to the not processed postcursors, producing intersymbol interference. The present method therefore permits reducing the number of filter tap operations to less than half for the same output, as opposed to the DDFSE algorithm The invention has been described above with respect to an exemplary embodiment thereof. However, it will be understood that departures can be made by those skilled in the art without departing from the spirit and scope of the invention which is limited only by the following claims.

What is claimed is:

1. A method of digital telecommunications via an electrical cable, including the steps of:

providing a data stream to be transmitted;

performing a digital-to-analog conversion of said data stream to thereby provide a transmission signal;

supplying said transmission signal to a transmission path;

receiving and sampling said transmission signal at an end of the transmission path;

processing said sampled signal;

supplying said sampled signal to a decision element;

further processing the sampled signal with a Viterbi decoder which operates on the basis of a trellis diagram, wherein said Viterbi decoder uses a number of feedback filters to determine branch metrics and path metrics in said trellis diagram, wherein said number is a function of states in said trellis diagram, and wherein filter taps of said feedback filters are positioned in line according to a delayed decision feedback estimation algorithm;

determining branch metrics in said trellis diagram using separate first feedback filters, said first feedback filters being used for certain symbol intervals in said trellis diagram;

determining branch metrics in said trellis diagram using a common feedback filter for all other symbol intervals other than said certain symbol intervals of the separate feedback filters in said trellis diagram; and supplying the symbols of a path with the smallest path metric in said trellis diagram at the end of said first feedback filters to said common feedback filter.

2. A method as claimed in claim 1, wherein said first feedback filters are used only up to a specific number of symbol intervals in said trellis diagram.

3. A method as claimed in claim 2, wherein the branch metrics in the trellis diagram are formed in accordance with the following terms:

$$ZM_k^v(z) = (y_k - f_0z - f_1x_{k-1}^v - \ldots - f_\mu x_{k-\mu}^v + \omega_{k-\mu-1}^v)^2$$

$$\omega_{k-\mu-1}^v = \underbrace{f_{\mu+1}x_{k-\mu-1}^v - \ldots - f_{\mu+\beta}x_{k-\mu-\beta}^v}_{\text{private DFE}} + \underbrace{f_{\mu+\beta+1}x_{k-\mu-\beta-1}^v - \ldots - f_n x_{k-n}^v}_{\text{common DFE}}$$

wherein:

$ZM_k^v(z)$=branch metric for state υ in a kth step;
$y_k$=sample value of a received symbol;
$f_0$=principal value of a channel pulse response;
$f_1$ to $f_n$=postcursors of the channel pulse response;
n=number of postcursors of a discrete-time channel pulse response;
$x_k^v$=symbol assumed to have been transmitted at state υ in step k;
z=symbol (amplitude stage) assumed to have been transmitted in a current step;
$\omega_k^v$=intersymbol interference estimated for state υ caused by postcursors at step k+μ+1;
X=number of possible amplitude stages per step;
μ=number of symbols or postcursors considred in the states of a Delayed Decision Feedback Sequence Estimation (DDFSE) algorithm;
β=number of symbols considered in a private DFE;
k=time index;
DFE=feedback filter;
wherein the portion of the equation designated "private DFE" considers said first feedback filters; and
wherein the portion of the equation designated "common DFE" considers said common feedback filter.

4. A method as claimed in claim 3, further including the step of providing a path memory which operates according to the principle of a Register-Exchange method for determining a path with the smallest path metric in said trellis diagram at the end of said first feedback filters.

5. A method as claimed in claim 4, wherein said step of supplying the symbols of a path with the smallest path metric includes obtaining an indicator from an Add, Compare and Select (ACS) unit of said Viterbi decoder.

6. A method as claimed in claim 3, further including the step of providing a path memory which operates according to the principle of a trace-back algorithm for determining a path with the smallest path metric in said trellis diagram at the end of said first feedback filters.

7. A method as claimed in claim 1, wherein said first feedback filters are used only up to a specifiable length of the feedback filters for all states in said trellis diagram.

8. A method as claimed in claim 7, wherein the branch metrics in the trellis diagram are formed in accordance with the following terms:

$$ZM_k^v(z) = (y_k - f_0z - f_1x_{k-1}^v - \ldots - f_\mu x_{k-\mu}^v + \omega_{k-\mu-1}^v)^2$$

$$\omega_{k-\mu-1}^v = \underbrace{f_{\mu+1}x_{k-\mu-1}^v - \ldots - f_{\mu+\beta}x_{k-\mu-\beta}^v}_{\text{private DFE}} + \underbrace{f_{\mu+\beta+1}x_{k-\mu-\beta-1}^v - \ldots - f_n x_{k-n}^v}_{\text{common DFE}}$$

wherein:

$ZM_k^v(z)$=branch metric for state υ in a kth step;
$y_k$=sample value of a received symbol;
$f_0$=principal value of a channel pulse response;
$f_1$ to $f_n$=postcursors of the channel pulse response;
n=number of postcursors of a discrete-time channel pulse response;
$x_k^v$=symbol assumed to have been transmitted at state υ in step k;
z=symbol (amplitude stage) assumed to have been transmitted in a current step;
$\omega_k^v$=intersymbol interference estimated for state υ caused by postcursors at step k+μ+1;
X=number of possible amplitude stages per step;
μ=number of symbols or postcursors considred in the states of a Delayed Decision Feedback Sequence Estimation (DDFSE) algorithm;
β=number of symbols considered in a private DFE;
k=time index;
DFE=feedback filter;
wherein the portion of the equation designated "private DFE" considers said first feedback filters; and
wherein the portion of the equation designated "common DFE" considers said common feedback filter.

9. A method as claimed in claim 8, further including the step of providing a path memory which operates according to the principle of a Register-Exchange method for determining a path with the smallest path metric in said trellis diagram at the end of said first feedback filters.

10. A method as claimed in claim 9, wherein said step of supplying the symbols of a path with the smallest path metric includes obtaining an indicator from an Add, Compare and Select (ACS) unit of said Viterbi decoder.

11. A method as claimed in claim 8, further including the step of providing a path memory which operates according to the principle of a trace-back algorithm for determining a path with the smallest path metric in said trellis diagram at the end of said first feedback filters.

12. A method as claimed in claim 1, wherein the branch metrics in the trellis diagram are formed in accordance with the following terms:

$$ZM_k^v(z) = (y_k - f_0z - f_1x_{k-1}^v - \ldots - f_\mu x_{k-\mu}^v + \omega_{k-\mu-1}^v)^2$$

$$\omega_{k-\mu-1}^v = \underbrace{f_{\mu+1}x_{k-\mu-1}^v - \ldots - f_{\mu+\beta}x_{k-\mu-\beta}^v}_{\text{private DFE}} + \underbrace{f_{\mu+\beta+1}x_{k-\mu-\beta-1}^v - \ldots - f_n x_{k-n}^v}_{\text{common DFE}}$$

wherein:

$ZM_k^v(z)$=branch metric for state υ in a kth step;
$y_k$=sample value of a received symbol;
$f_0$=principal value of a channel pulse response;
$f_1$ to $f_n$=postcursors of the channel pulse response;
n=number of postcursors of a discrete-time channel pulse response;
$x_k^v$=symbol assumed to have been transmitted at state υ in step k;
z=symbol (amplitude stage) assumed to have been transmitted in a current step;
$\omega_k^v$=intersymbol interference estimated for state υ caused by postcursors at step k+μ+1;
X=number of possible amplitude stages per step;
μ=number of symbols or postcursors considered in the states of a Delayed Decision Feedback Sequence Estimation (DDFSE) algorithm;
β=number of symbols considered in a private DFE;

k=time index;

DFE=feedback filter;

wherein the portion of the equation designated "private DFE" considers said first feedback filters; and wherein the portion of the equation designated "common DFE" considers said common feedback filter.

13. A method as claimed in claim 1, further including the step of providing a path memory which operates according to the principle of a Register-Exchange method for determining a path with the smallest path metric in said trellis diagram at the end of said first feedback filters.

14. A method as claimed in claim 1, wherein said step of supplying the symbols of a path with the smallest path metric includes obtaining an indicator from an Add, Compare and Select (ACS) unit of said Viterbi decoder.

15. A method as claimed in claim 1, further including the step of providing a path memory which operates according to the principle of a trace-back algorithm for determining a path with the smallest path metric in said trellis diagram at the end of said first feedback filters.

* * * * *

UNITED STATES PATENT AND TRADEMARK OFFICE
CERTIFICATE OF CORRECTION

PATENT NO. : 5,870,433
DATED : February 9, 1999
INVENTOR(S) : Johannes Huber et al.

It is certified that error appears in the above-identified patent and that said Letters Patent is hereby corrected as shown below:

In column 9, line 2, --with-- should be inserted between the equations.

In column 9, line 57, --with-- should be inserted between the equations.

In column 10, line 42, --with-- should be inserted between the equations.

Signed and Sealed this

Tenth Day of August, 1999

Attest:

Attesting Officer

Q. TODD DICKINSON

Acting Commissioner of Patents and Trademarks